United States Patent
Okubo et al.

(10) Patent No.: US 8,583,301 B2
(45) Date of Patent: Nov. 12, 2013

(54) ENGINE SPEED CONTROL FOR AN ENGINE IN A HYBRID ELECTRIC VEHICLE POWERTRAIN FOR IMPROVED NOISE, VIBRATION AND HARSHNESS

(75) Inventors: Shunsuke Okubo, Belleville, MI (US); Paul Stephen Bryan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 863 days.

(21) Appl. No.: 12/032,184

(22) Filed: Feb. 15, 2008

(65) Prior Publication Data
US 2009/0210108 A1 Aug. 20, 2009

(51) Int. Cl.
*B60K 1/00* (2006.01)

(52) U.S. Cl.
USPC ............................................ 701/22; 180/65.1

(58) Field of Classification Search
USPC ......... 701/22; 180/65.1, 65.21, 65.265, 65.28
See application file for complete search history.

(56) References Cited

U.S. PATENT DOCUMENTS

| | | | |
|---|---|---|---|
| 5,606,946 A | 3/1997 | Data et al. | |
| 6,173,574 B1 * | 1/2001 | Obayashi et al. | 60/710 |
| 6,209,672 B1 | 4/2001 | Severinsky | |
| 6,336,063 B1 | 1/2002 | Lennevi | |
| 6,437,456 B1 | 8/2002 | Kimura et al. | |
| 6,443,126 B1 | 9/2002 | Morimoto et al. | |
| 6,500,089 B2 | 12/2002 | Lasson et al. | |
| 6,580,977 B2 * | 6/2003 | Ding et al. | 701/22 |
| 6,659,078 B2 | 12/2003 | Bergeon et al. | |
| 6,907,325 B1 * | 6/2005 | Syed et al. | 701/22 |
| 6,926,639 B2 * | 8/2005 | Hopper | 477/110 |
| 7,055,636 B2 | 6/2006 | Komiyama et al. | |
| 7,070,530 B2 | 7/2006 | Ai et al. | |
| 7,869,911 B2 | 1/2011 | Yamaguchi | |
| 2002/0065165 A1 | 5/2002 | Lasson et al. | |
| 2002/0065589 A1 * | 5/2002 | Ostberg et al. | 701/22 |
| 2004/0249525 A1 | 12/2004 | Okoshi et al. | |
| 2005/0049100 A1 | 3/2005 | Ai et al. | |
| 2005/0088139 A1 * | 4/2005 | Frank | 320/104 |
| 2006/0111212 A9 | 5/2006 | Ai et al. | |
| 2007/0170778 A1 | 7/2007 | Yamaguchi | |
| 2007/0216312 A1 * | 9/2007 | Ogata et al. | 315/131 |

(Continued)

FOREIGN PATENT DOCUMENTS

WO 2008/084587 A1 7/2008

OTHER PUBLICATIONS

Syed, Kuang, Czubay, Smith, Ying, "Fuzzy control to improve high-Voltage Battery Power and Enging Speed Control in a Hybrid Electric Vehicle", Annual Meeting of the North American Fuzzy Information Processing Society, pp. 343-348, 2005.*

(Continued)

*Primary Examiner* — Thomas Tarcza
*Assistant Examiner* — Adam Tissot
(74) *Attorney, Agent, or Firm* — David B. Kelley; Brooks Kushman P.C.

(57) ABSTRACT

A control strategy is disclosed for regulating speed of an engine in a hybrid electric vehicle powertrain that includes an electric motor and gearing. An electrical power flow path and a mechanical power flow path are established. Electrical power is coordinated with mechanical power to effect an arbitrated engine speed for a given power demand that will result in an acceptable noise, vibration and harshness (NVH) characteristic for the powertrain and an acceptable powertrain efficiency.

19 Claims, 6 Drawing Sheets

(56) References Cited

U.S. PATENT DOCUMENTS

2007/0225887 A1 9/2007 Morris
2009/0105896 A1 4/2009 Tamai et al.
2009/0118940 A1 5/2009 Heap et al.
2009/0210108 A1 8/2009 Okubo et al.
2010/0076663 A1 3/2010 Jinno et al.

OTHER PUBLICATIONS

Komada et al., Noise and Vibration Reduction Technology in New Generation Hybrid Vehicle Development, SAE 2005-01-2294, SAE 2005 Noise and Vibration Conference and Exhibition, Traverse City, MI May 16-19, 2005, pp. 1-10.

* cited by examiner

ENGINE SPEED CONTROL FOR AN ENGINE IN A HYBRID ELECTRIC VEHICLE POWERTRAIN FOR IMPROVED NOISE, VIBRATION AND HARSHNESS

BACKGROUND OF THE INVENTION

1. Field of the Invention

The invention relates to control of an engine in a hybrid electric vehicle powertrain with a divided power flow path from the engine and from an electric motor.

2. Background Art

In a hybrid electric vehicle (HEV) powertrain having an internal combustion engine and an electric motor, the power of each of these power sources may be distributed through separate torque flow paths to vehicle traction wheels, one path being a mechanical path and the other being an electromechanical path. The percentage of total power transferred to the vehicle traction wheels from each power source will vary depending upon the operating conditions for the vehicle, including driver demand for power and a state-of-charge of a battery that is electrically coupled to a vehicle traction motor and to an electric generator.

In a known hybrid electric vehicle powertrain of this type, the generator may be mechanically connected to the sun gear of a simple planetary gear unit, and a carrier may be drivably connected to an engine. The ring gear of the simple planetary gear unit is connected through gearing to the traction wheels. Engine speed can be controlled by controlling generator speed as the level of electro-mechanical power delivery is adjusted due to varying vehicle operating conditions.

In co-pending application Ser. No. 11/566,876, filed Dec. 5, 2006 entitled "System and Method for Controlling an Operating Temperature of a Catalyst of a Vehicle Exhaust System," now U.S. Pat. No. 7,832,198, which is assigned to the assignee of the present invention, a known relationship between engine torque and engine speed may be used in determining a driver demand for power at the traction wheels. A desired threshold of engine power is related functionally to a predetermined temperature of a catalyst in the engine exhaust system. Power from the engine can be modified by supplying a power bias from the battery to reduce the portion of the total power supplied by the engine needed to meet the driver demand for power at the wheels. The temperature of the catalyst thus can be maintained below a predetermined threshold catalyst temperature. This eliminates the need for reducing catalyst temperature by enabling an air/fuel enrichment feature in a powertrain of this type, which would deteriorate the quality of engine exhaust gas emissions.

An operating strategy for controlling engine speed and torque values to meet a desired overall powertrain efficiency is disclosed in co-pending U.S. patent application Ser. No. 11/161,424, filed Aug. 2, 2005 entitled "Optimal Engine Operating Power Management Strategy for a Hybrid Electric Vehicle Powertrain," now U.S. Pat. No. 7,398,147, which also is assigned to the assignee of the present invention. That operating strategy recognizes that engine efficiency has the most influence on total system efficiency, but highly efficient engine operation is not achieved at the expense of a lowering of the total system efficiency. The appropriate engine speed and torque values for achieving maximum system efficiency is achieved by considering the efficiency of each of the components of the overall powertrain system. The power loss for each of the system components is obtained, and the engine speed is commanded so that it corresponds to the minimum value of the sum of the total powertrain system losses.

The strategies of the co-pending patent applications include method steps that are common to the method steps of the strategy of the present invention. In the case of the strategy of the '424 patent application, engine noise, vibration and harshness characteristics in a hybrid electric vehicle powertrain are not considered while effecting best powertrain efficiency. The vehicle system control architecture is not designed to adjust the target engine speed to achieve optimum noise, vibration and harshness (NVH). There is no arbitration of powertrain operating variables to achieve acceptable powertrain efficiency while meeting a goal of optimum noise, vibration and harshness.

SUMMARY OF THE INVENTION

The present invention, in contrast to strategies of the type disclosed in the co-pending patent applications mentioned above, comprises a strategy capable of making an appropriate trade-off between the engine operating point for maximum efficiency and the engine operating point that takes into consideration noise, vibration and harshness. The strategy of the present invention will calculate a so-called battery power offset that is used to adjust target engine power command to yield a desired engine speed and vehicle speed relationship. This offset is limited by the capability of the battery and by other operating variables. That is, it is determined by the state of charge of the battery as well as variables such as battery temperatures, age of the battery and battery pack balance.

As in the case of the strategy of the co-pending applications mentioned above, the strategy of the present invention assumes that the engine is the primary power source. It will calculate the ideal engine speed for an acceptable noise, vibration and harshness characteristic based on predetermined noise, vibration and harshness requirements. The noise, vibration and harshness (NVH) requirements are determined in usual fashion by precalibration. The strategy will observe whether an engine speed for optimum NVH is less than an optimum engine speed for best efficiency. If it is less, the optimum NVH strategy may be executed. This gives an arbitrated target speed for noise, vibration and harshness.

The strategy then will calculate in real time a variable engine power at the arbitrated target engine speed. The difference between the driver demanded power and the engine power at the arbitrated engine speed is the amount of battery power bias that the strategy requests. This battery offset augments the actual engine power to meet the demand for power at the traction wheels. Before this addition of a battery offset is made, the battery state-of-charge (SOC) and discharge power limits are taken into account.

The strategy determines the maximum of the battery power bias value for optimum NVH, the battery power available for a given battery state-of-charge and a battery power bias for best efficiency. This information is used to calculate a corresponding engine power. That engine power will determine the engine speed for optimum NVH, and the engine then is commanded to operate at that speed.

Unlike known HEV control strategies, the strategy of the present invention achieves an appropriate engine power command without clipping the engine speed because of NVH considerations. That is, the engine speed is not clipped as the battery is called upon to supply a power shortfall. The strategy of the present invention thus will not disable the vehicle system controller's battery feedback and will not disable the vehicle system controller components that are dedicated to computing a desired engine speed. Further, the strategy of the invention will provide a powertrain calibrator with a simple and straightforward way to effect arbitration of operating variables to obtain an appropriate trade-off, for example, of NVH considerations, powertrain fuel economy considerations and exhaust gas quality considerations.

DETAILED DESCRIPTION OF THE PREFERRED EMBODIMENT(S)

Figure 1:
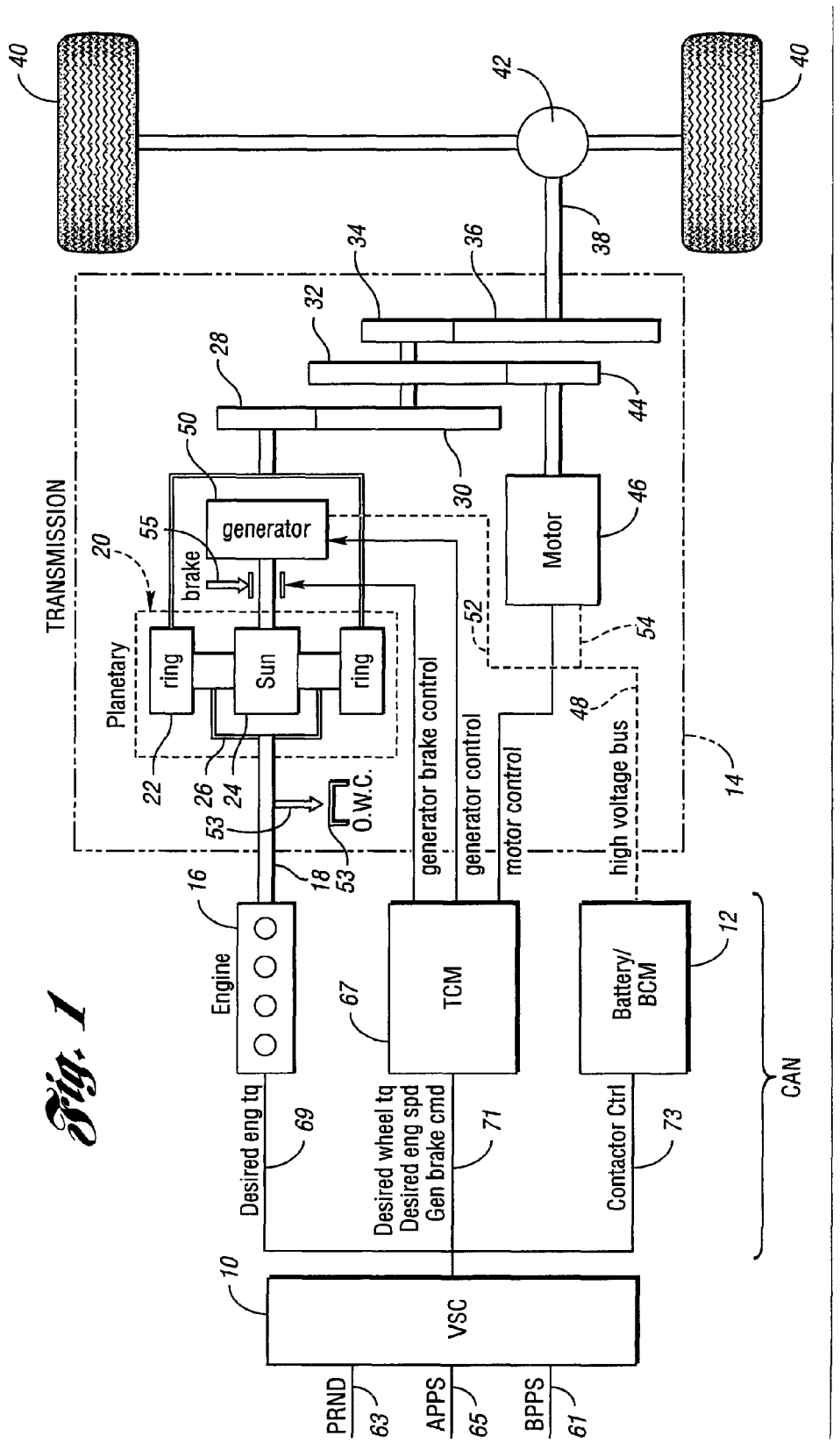
FIG. 1 is a schematic view of a hybrid electric vehicle powertrain system having divided power flow paths between an engine and an electric motor through power transmitting gearing to vehicle traction wheels.

The hybrid electric vehicle powertrain of one embodiment of the invention has a configuration as shown in FIG. 1. A vehicle system controller 10, a battery and battery control module 12 and a control module 67 for a transmission 14, together with a motor/generator subsystem, comprise a control area network (CAN). An engine 16, controlled by controller 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential-and-axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery of module 12 delivers electric power to the motor through power flow path 48. Generator 50 is connected electrically to the battery and to the motor in known fashion, as shown at 52.

Assuming that there is a battery power request for charging, that request will be considered to be a request for negative power. If the battery power request calls for discharging the battery, that request will be considered to be a request for positive power.

When the powertrain battery of module 12 is acting as a sole power source with the engine off, the torque input shaft 18 and the carrier assembly 26 are braked by an overrunning coupling 53. A mechanical brake 55 anchors the rotor of generator 50 and the sun gear 24 when the engine is on and the powertrain is in a parallel drive mode, the sun gear 24 acting as a reaction element.

In FIG. 1, the vehicle system controller 10 receives a signal at 63 from a transmission range selector, which is distributed to transmission control module 67, together with a desired wheel torque, a desired engine speed and a generator brake command, as shown at 71. A battery contactor or switch 73 is closed after a vehicle "key-on" startup. The controller 10 issues a desired engine torque request to engine 16, as shown at 69, which is dependent on accelerator pedal position sensor output 65.

A brake pedal position sensor distributes a wheel brake signal to controller 10, as shown at 61. The transmission control module issues a generator brake control signal to generator brake 55. It also distributes a generator control signal to generator 50.

As mentioned previously, there are two power sources for the driveline. The first power source is a combination of the engine and generator subsystems, which are connected together using the planetary gear unit 20. The other power source involves only the electric drive system including the motor, the generator and the battery, wherein the battery acts as an energy storage medium for the generator and the motor.

Figure 1A:
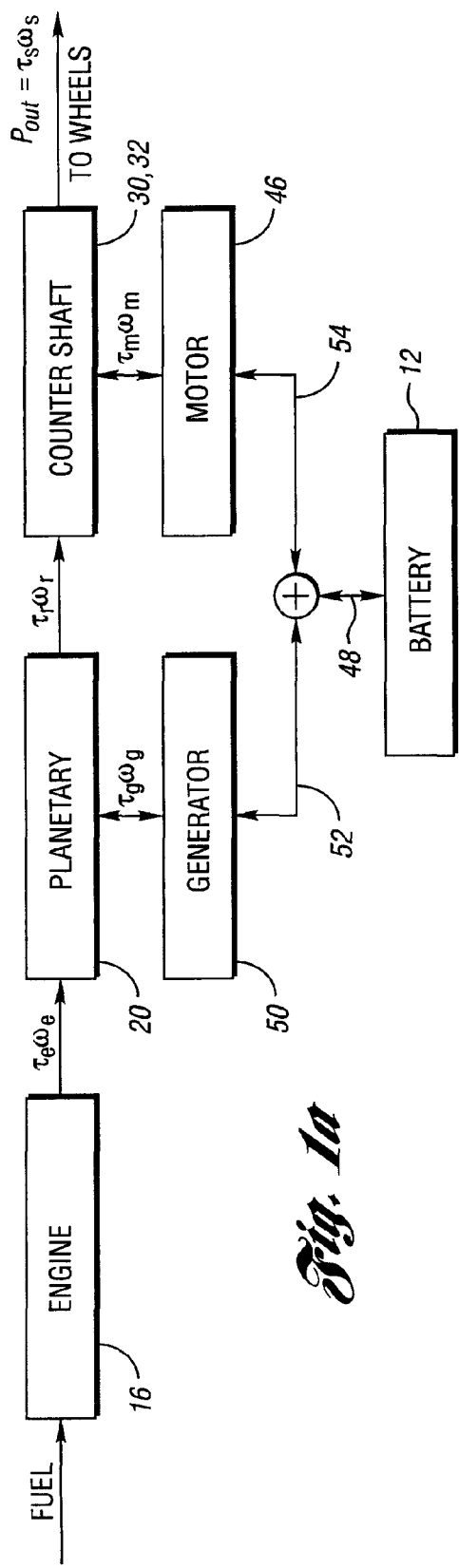
FIG. 1a is a schematic block diagram showing the power flow paths from the engine, and to and from the motor/generator battery subsystem.

The power flow paths between the various elements of the powertrain diagram shown in FIG. 1 is illustrated in FIG. 1a. Fuel is delivered to the engine 16 under the control of the operator in known fashion using an engine accelerator pedal. Engine power delivered to the planetary gear unit 20 is expressed as $\tau_e \omega_e$, where $\tau_e$ is engine torque and $\omega_e$ is engine speed. Power delivered from the planetary ring gear to the countershaft gears is expressed as $\tau_r \omega_r$, which is the product of ring gear torque and ring gear speed. Power out from the transmission 14 is represented by the symbols $\tau_s$ and $\omega_s$, the torque of shaft 38 and the speed of shaft 38, respectively.

The generator, when it is acting as a motor, can deliver power to the planetary gearing. Alternatively, it can be driven by the planetary gearing, as represented in FIG. 1a, by the power flow path 52. Similarly, power distribution between the motor and the countershaft gears can be distributed in either direction, as shown by the power flow path 54. Driving power from the battery or charging power to the battery is represented by the bi-directional arrow 48.

Figure 1C:
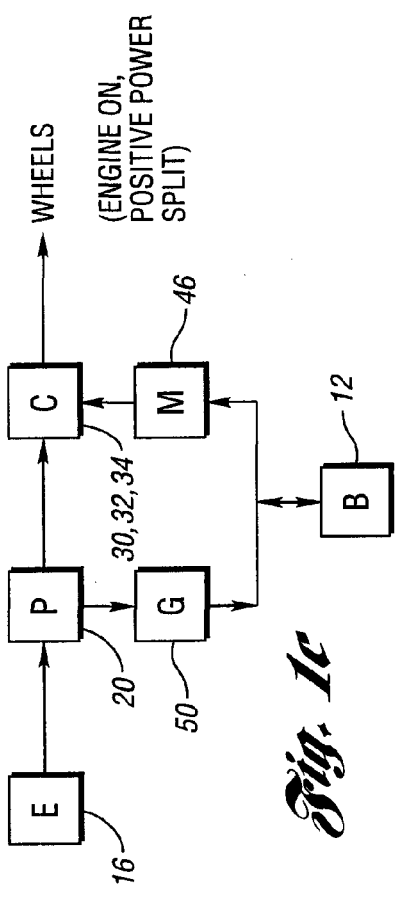
FIGS. 1b through 1e are schematic diagrams of the power flow paths from the engine, and to and from the motor/generator subsystem for various powertrain operating states.

As shown in FIG. 1a, engine output power can be split into two paths by controlling the generator speed. The mechanical power flow path, $\tau_r \omega_r$, is from the engine to the carrier to the ring gear to the countershaft. The electrical power flow path is from the engine to the generator to the motor to the countershaft. The engine power is split, whereby the engine speed is disassociated from the vehicle speed during a so-called positive split mode of operation. This condition is illustrated in FIG. 1c, where the engine 16 delivers power to the planetary gearing 20, which delivers power to the countershaft gears 30, 32 and 34, which in turn drive the wheels. A portion of the planetary gearing power is distributed to the generator 50, which delivers charging power to the battery at 12. The speed of the generator is greater than zero or positive, and the generator torque is less than zero. The battery drives the motor 46, which distributes power to the countershaft. This arrangement is a positive split.

If the generator, due to the mechanical properties of the planetary gear unit, acts as a power input to the planetary gear unit to drive the vehicle, the operating mode can be referred to as a negative split. This condition is shown in FIG. 1d where the generator speed is negative and the generator torque also is negative.

Figure 1B:
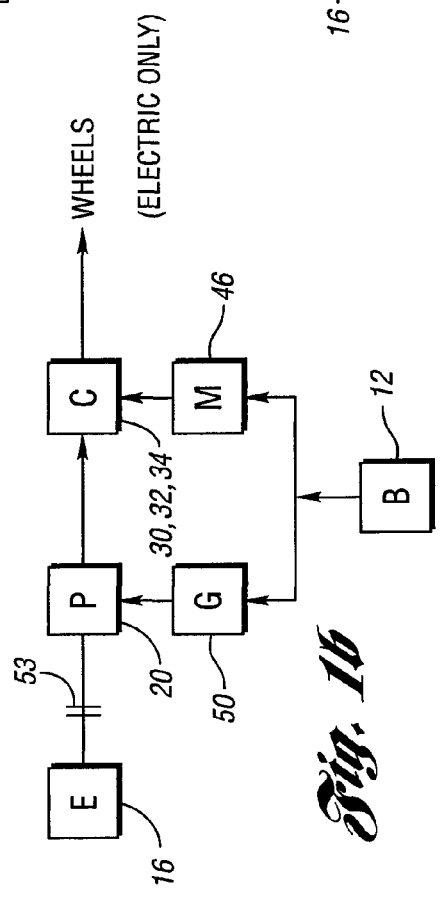
Figure 1D:
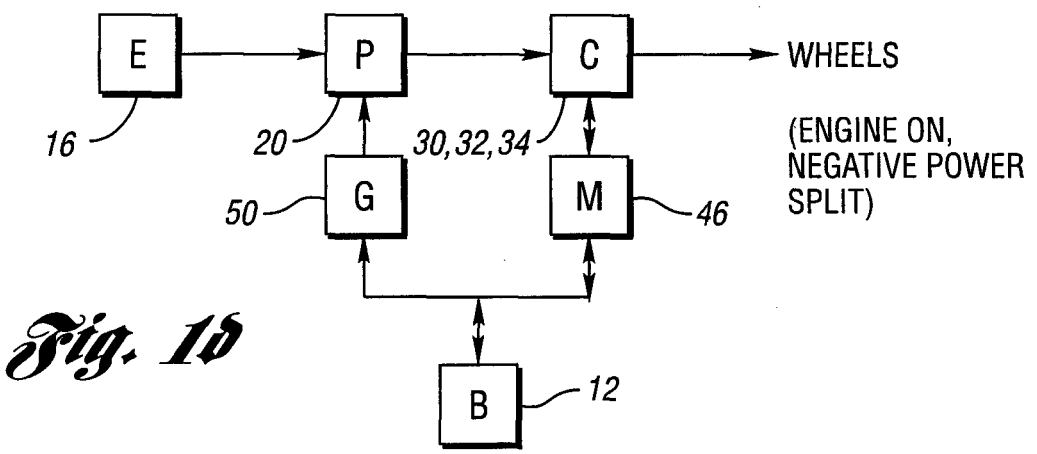

The generator in FIG. 1d delivers power to the planetary gear unit 20 as the motor 46 acts as a generator and the battery 12 is charging. It is possible, however, that under some conditions the motor may distribute power to the countershaft gearing if the resulting torque at the wheels from the gearing does not satisfy the driver demand. Then the motor must make up the difference.

Figure 1E:
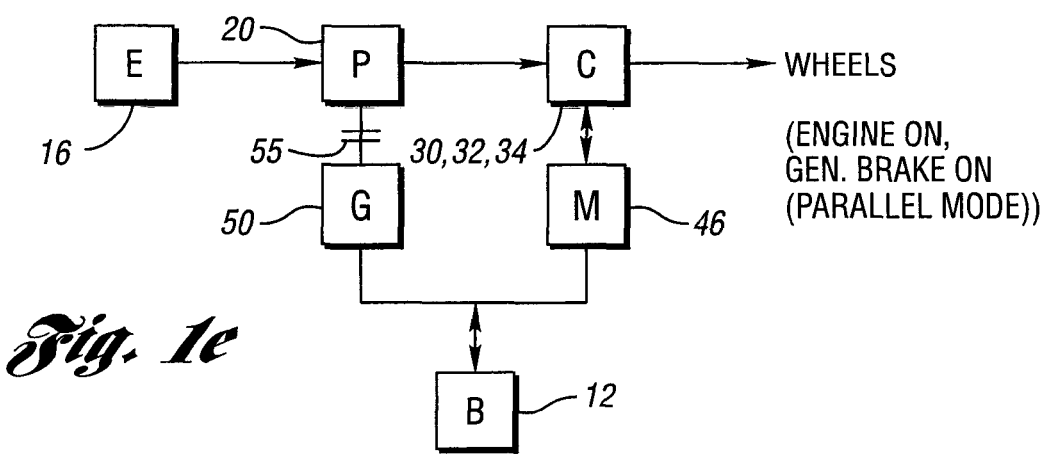

If the generator brake 55 is activated, a parallel operating mode is established. This is shown in FIG. 1e, where the engine 16 is on and the generator is braked. The battery at 12 powers the motor 46, which powers the countershaft gearing simultaneously with delivery of power from the engine to the planetary gearing to the countershaft gearing.

The engine can deliver power only for forward propulsion because there is no reverse gear in the countershaft gearing. The engine requires either generator control or a generator brake to permit transfer of power to the wheels for forward motion.

The second source of power, previously described, is the battery, generator and motor subsystem. This is illustrated in FIG. 1b. In this driving mode, the engine is braked by the overrunning coupling 53. The electric motor draws power from the battery and effects propulsion independently of the engine, with either forward or reverse motion. The generator may draw power from the battery and drive against a reaction of the one-way coupling 53. The generator in this mode operates as a motor.

The control strategy of the present invention will cause the engine to operate, whenever that is possible, to satisfy the driver's demand for power even when the motor subsystem is inactive. This is done while maintaining the battery state-of-charge at or above a target value. Maintaining the state-of-charge at its target value will ensure that the other subsystems that use battery power are functioning normally and that the battery will not be overcharged or overdischarged.

Figure 2:
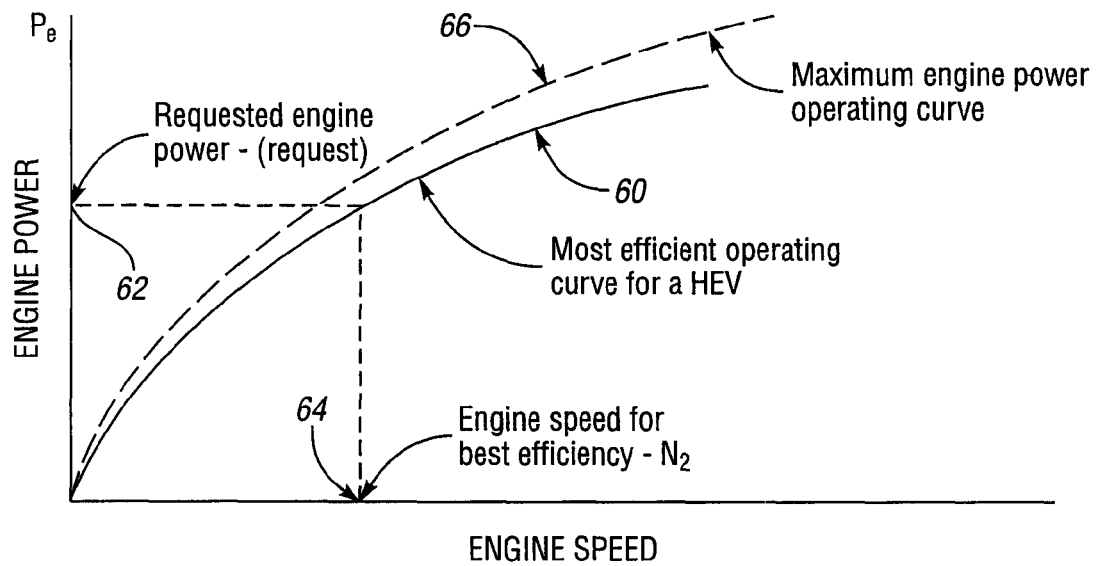
FIG. 2 is a plot showing the relationship between engine power and engine speed for the hybrid electric vehicle powertrain.

In executing the strategy of the present invention, it is necessary to establish an engine power and engine speed relationship that will result in the most efficient engine operating curve for a hybrid electric vehicle powertrain. An example of such a curve is illustrated in FIG. 2 at 60. It is stored in ROM registers of the VSC 10. The plot of FIG. 2 is a two-dimensional plot of engine power and vehicle speed for an engine in a HEV powertrain. A plot showing the maximum engine power operating curve with best efficiency for an engine of comparable capacity in a non-HEV powertrain is shown at 66. It is illustrated for purposes of comparing the parameters for the operating curve 60 with the parameters of an operating curve corresponding to a maximum engine power operation with best efficiency for a conventional powertrain.

Differences in the characteristic maximum engine power and engine speed plot for a conventional vehicle powertrain and a corresponding plot for a hybrid electric vehicle (HEV) powertrain are due in part to the fact that an engine with an Atkinson cycle, with its typical late valve opening feature, would likely be used in a HEV whereas an engine with an Otto cycle typically would be used in a conventional vehicle powertrain. Furthermore, an engine in a HEV typically would be smaller, and thus would operate in a higher speed range for a given power.

Reference may be made to previously mentioned co-pending patent application Ser. No. 11/161,424, filed Aug. 2, 2005 entitled "Optimum Engine Operating Power Management Strategy for a Hybrid Electric Vehicle Powertrain" for a description of a method for developing an optimal engine management strategy at a given target engine speed. The target engine speed is developed so that the total power system loss is a minimum. This is accomplished by minimizing the total system loss for each powertrain component. For any given engine speed command, there will be a computation of all of the power losses. The minimum value for these computations of power loss at a given engine speed command then is determined. The engine speed that will correspond to the minimum total power loss will not be the same as the engine speed that would correspond to a maximum engine efficiency, but it is a speed that corresponds to maximum total system efficiency.

In an alternate step of the control routine of the co-pending '424 patent application, it is possible to achieve a minimum total system loss by developing off-line, in a precalibration procedure, a look-up table that can be stored in read-only memory (ROM) of vehicle system controller 10, seen in FIG. 1. The look-up table will establish for every total power command and for each corresponding vehicle speed, a predetermined engine speed that will achieve minimum total powertrain losses. This results in maximum powertrain efficiency. The use of a table rather than a real time computation of losses may reduce the number of computations for the vehicle system controller 10 during each control loop of a central processor unit of controller 10. The individual calculations of power losses for the individual components of the powertrain can be eliminated and replaced by engine speed values computed off-line and pre-recorded in the look-up table.

Figure 3:
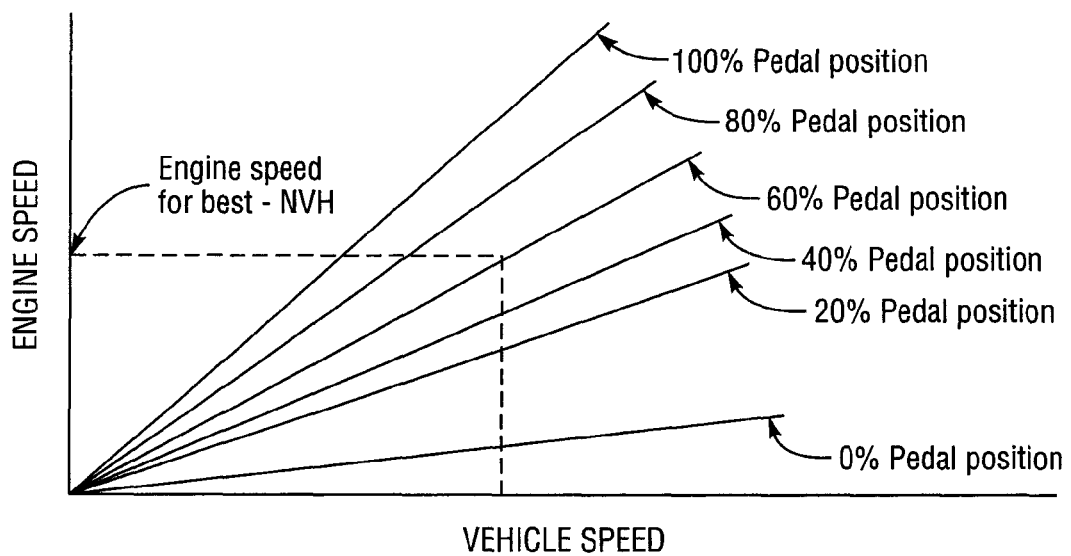
FIG. 3 is a plot showing one possible relationship between engine speed and vehicle speed for various driver operated accelerator pedal positions to achieve an engine speed for optimum noise, vibration and harshness (NVH) powertrain characteristics.
Figure 4:
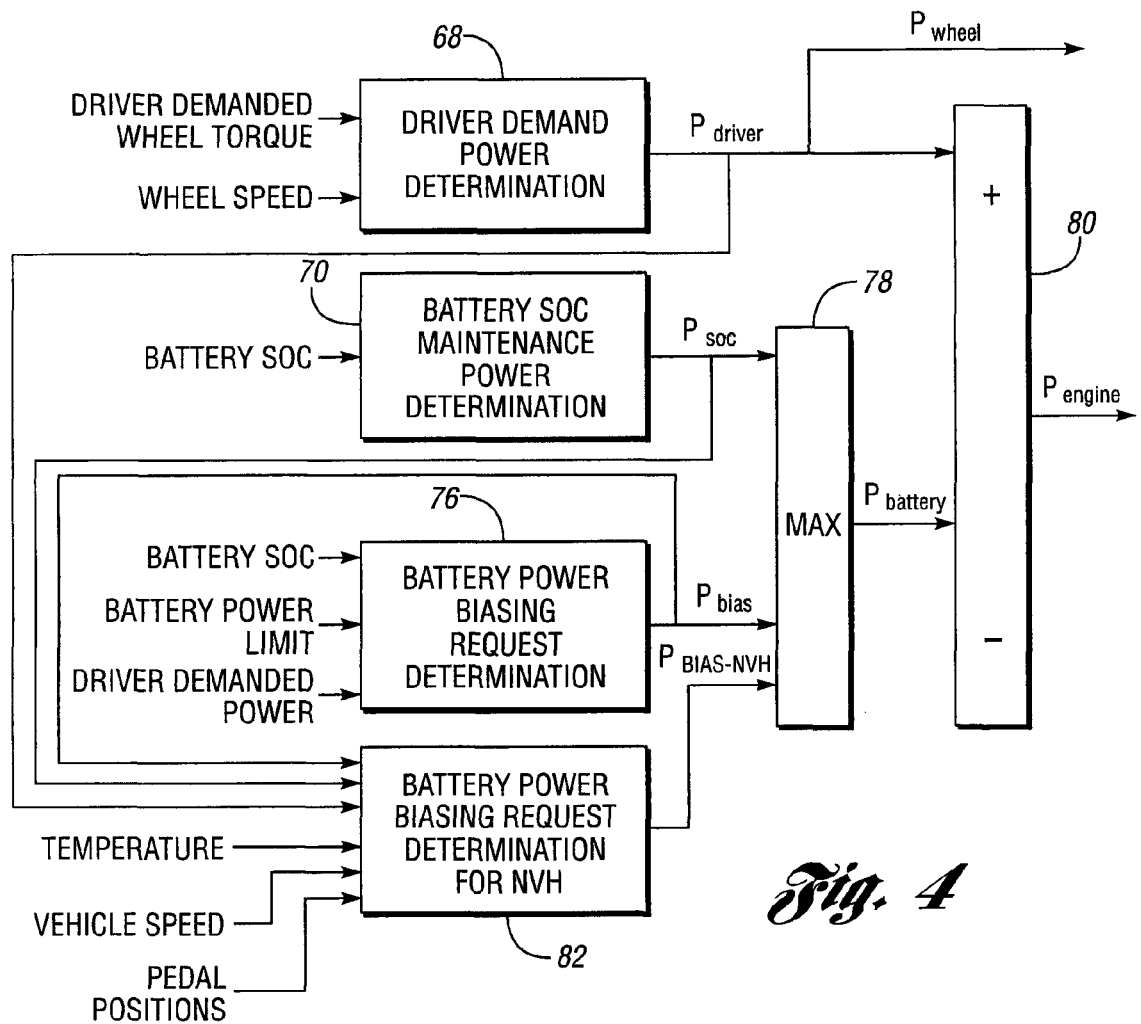
FIG. 4 is a block diagram of the overall control system for executing the strategy of the invention.

As seen in FIG. 4, the power request by the driver is determined at strategy control block 68. The driver demand, or request for power, is indicated in FIG. 4 by the symbol $P_{driver}$. The computations that occur at block 68 use as input a driver demanded wheel torque and a wheel speed. Wheel speed, which is a function of vehicle speed, can be related to engine speed as indicated in the plot of FIG. 3, where an engine speed $N_1$ that will achieve the best NVH characteristic is indicated for various accelerator pedal positions. The plot of FIG. 3 is an example of one of many possible precalibrated relationships between engine speed and vehicle speed that may be entered in memory for the vehicle system controller 10. Any given plot may take a shape quite different than the particular plot shown in FIG. 3. Further, other inputs may be used as well.

Figure 5:
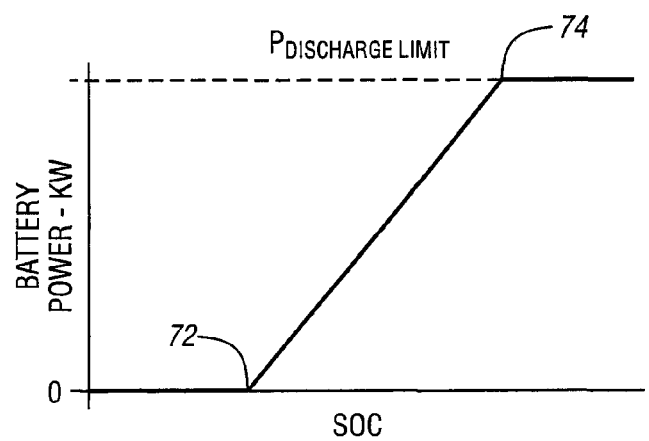
FIG. 5 is a plot of battery power available for various battery states-of-charge (SOC) up to a battery power discharge limit.

The schematic diagram of FIG. 4 also determines the battery SOC maintenance power determination for a given battery SOC. This occurs at block 70. Battery power is available within battery discharge power limits, which is indicated in FIG. 5. For any SOC in excess of a minimum value seen at 72 in FIG. 5, the battery power available increases relatively linearly until a discharge power limit value is reached at 74. The information in FIG. 5 is stored in controller memory and made available at block 70.

A target battery power is obtained by determining a difference between power at the wheels and power at the engine. If the power at the wheels is larger than the power at the engine, then the battery shown at 12 in FIG. 1 will be discharged. Further, if the power at the wheels is less than the power at the engine, power is stored in the battery 12.

FIG. 4 illustrates in block diagram form a strategy used by the controller to calculate power at the engine ($P_{engine}$), power at the wheels ($P_{wheel}$), and battery SOC to meet the driver demand for power and to maintain battery SOC. The difference between power at the wheels and power at the engine is controlled by the battery SOC maintenance power determination strategy at 70. This strategy will target a steady state battery power $P_{SOC}$. During normal operation $P_{SOC}$ will be within a few percentage points of the target value.

At block 76 in FIG. 4 a battery power biasing request determination is made. Using inputs such as battery SOC, battery power limit and driver demanded power, this portion of the strategy will determine a power bias ($P_{bias}$). The values for $P_{SOC}$ and $P_{bias}$ are arbitrated at block 78, along with a power bias for desired NVH, as will be described subsequently. The larger of the values for $P_{SOC}$ and $P_{bias}$ is selected at block 78 to produce a battery power value ($P_{battery}$) that is subtracted at block 80 from a driver request for power. The values are arbitrated at block 80 so that the driver demand for power is changed (e.g., reduced) by the amount of the battery power bias to produce an engine power command ($P_{engine}$). This power command, reduced by $P_{bias}$, will be of a value that will protect the engine during operation under abnormal operating conditions such as when the engine exhaust system catalyst is exposed to exhaust gas temperatures that are too high. Exhaust gas temperatures that exceed a catalyst over-temperature protection value would trigger an enrichment of the air/fuel mixture. This is an undesirable condition since undesirable engine exhaust gas emissions would result.

The strategy routines executed at 68, 70 and 76 are disclosed in the previously discussed co-pending '876 patent application.

The strategy of FIG. 4 also includes a step for a battery power biasing request determination for optimum NVH. This occurs at block 82. The routine carried out at 82 provides an additional power bias variable for optimum NVH ($P_{bias-NVH}$). The inputs for the routine at 82 are the battery SOC, the previously described battery power bias $P_{bias}$, the driver demand for power ($P_{driver}$), etc. One of the inputs may be barometric pressure, although it is not shown in FIG. 4. The driver demand for power $P_{driver}$ is the same as the power at the wheels ($P_{wheel}$). Other inputs that are used in a battery power biasing request determination for optimum NVH may be vehicle speed, pedal position, battery temperature, etc. Some of these inputs can be obtained, for example, using the relationships described with reference to FIGS. 2 and 3.

The power output $P_{bias-NVH}$, which is the result of the execution of the strategy at block 82, is distributed to block 78, where an arbitration or comparison is made between $P_{SOC}$, $P_{bias}$ and $P_{bias-NVH}$. At block 78, a calculation is made to determine the maximum of the three inputs. That maximum is indicated by the symbol $P_{battery}$. This value is subtracted at block 80 from the driver demand for power to produce an engine power $P_{engine}$. This operating power level for the engine is used as a power command to develop an appropriate engine torque and speed such as the speed relationships seen in FIG. 3.

Figure 6:
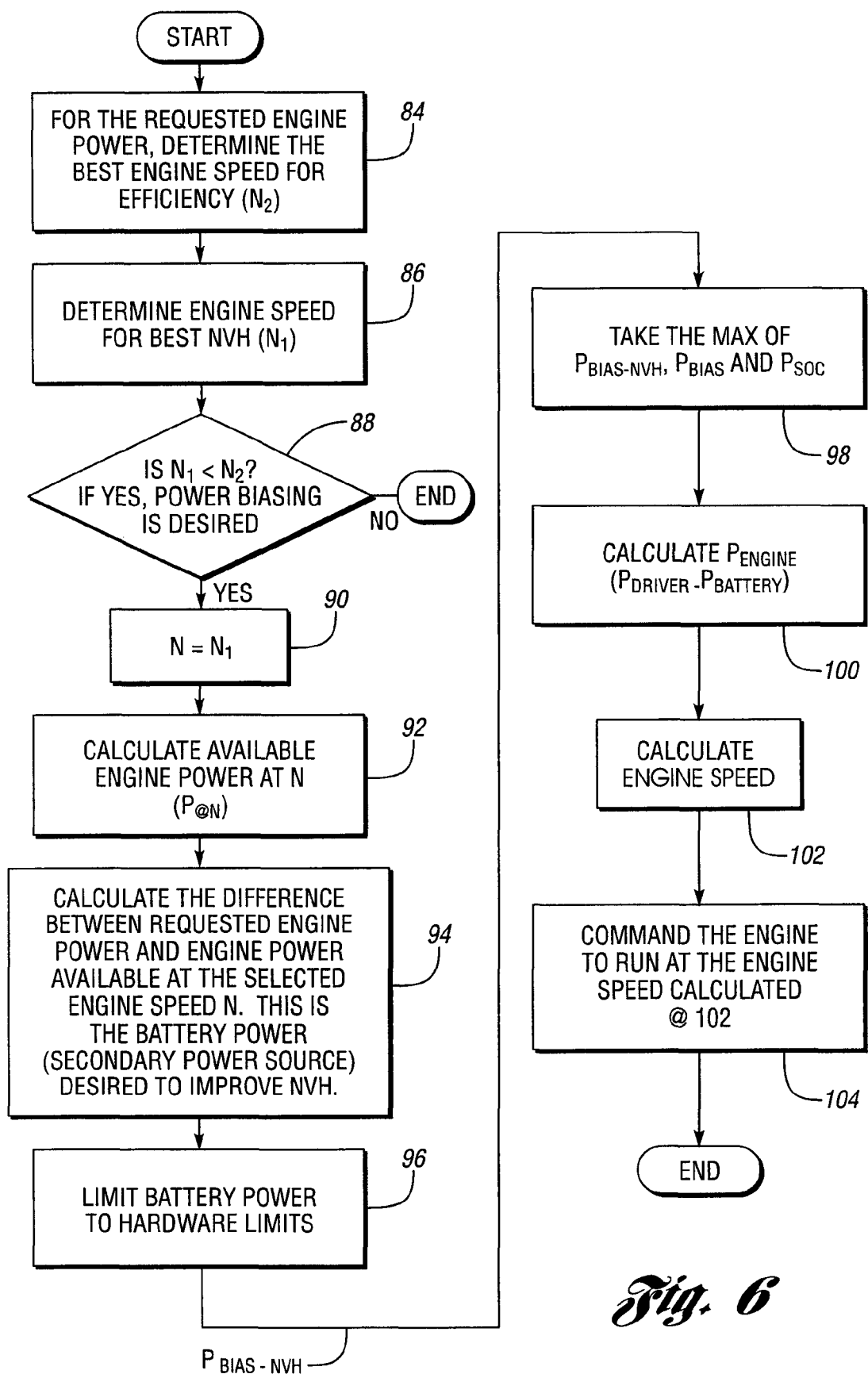
FIG. 6 is a flow diagram that summarizes the strategy steps used in the control routine of the present invention.

FIG. 6 is a flowchart that shows the sequence of steps in the strategy routine. At action block 84, a determination is made of the engine speed $N_2$ needed for maximum efficiency at a requested engine power, as described previously with respect to FIG. 2. That step is followed by the routine at action block 86, where a determination is made of the engine speed $N_1$ for best NVH. At action block 88, it is determined whether the engine speed for best NVH is less than the engine speed for best efficiency. If the result of that inquiry is positive, battery power biasing is desired. That speed value then is treated as a commanded engine speed or target engine speed $N_1$ which is used at 90 to determine the available engine power at the target engine speed N. This occurs at action block 92 using the information in memory plotted in FIG. 2.

Following a determination of engine power available, the routine proceeds to action block 94 where the strategy will calculate a difference between the requested engine power and the engine power available at the target engine speed N. This is the battery power desired to improve NVH, which can be expressed as follows: $P_{request} - P@N = P_{bias-NVH}$.

The routine then proceeds to block 96, where the battery power determined at block 94 is tested to determine whether the battery power hardware limits are exceeded.

The output of the strategy routine at action block 96 is the power bias for best NVH ($P_{bias-NVH}$), which is made available to block 98 as seen in FIG. 4. At action block 98, the routine will take maximum values for $P_{bias-NVH}$, $P_{bias}$ and $P_{SOC}$. Using that maximum value, the power at the battery is subtracted at action block 100 from the driver demanded power, as described with reference to FIG. 4, to produce an engine power value that takes into account the engine power needed for optimum NVH. That engine power is used to determine a speed command using the information in FIG. 2. This occurs at action block 102. The engine then is commanded at action block 104 to run at the engine speed determined at action block 102.

Although an embodiment of the invention has been disclosed, modifications will be apparent to persons skilled in the art. All such modifications and equivalents thereof are intended to be covered by the following claims.

What is claimed:

1. A method comprising:
adjusting engine speed using a microprocessor-based controller for an engine in a hybrid electric vehicle powertrain to achieve an arbitrated engine speed that will effect a desired noise, vibration and harshness (NVH) powertrain characteristic and an acceptable powertrain efficiency, the powertrain comprising an electric motor that complements power of the engine, and gearing defining power flow paths from the motor and the engine to vehicle traction wheels, the arbitrated engine speed based on
available engine power at a target engine speed that is less than an engine speed that results in best powertrain efficiency for a given driver requested power,
a battery power bias for desired noise, vibration and harshness that is equal to a difference between the driver requested power and the available engine power at the target engine speed,
and battery power at a steady state battery state-of-charge.

2. A method comprising:
controlling engine speed in a hybrid vehicle using a controller configured to adjust engine speed in response to a target engine speed for desired powertrain noise, vibration and harshness (NVH) that is less than an optimum speed for engine efficiency, an engine power at the target speed, and
a calculated NVH bias battery power equal to the difference between the engine power at the target speed and a driver requested power.

3. A method for adjusting engine speed for an engine in a hybrid electric vehicle powertrain to achieve an arbitrated engine speed that will effect a desired noise, vibration and harshness (NVH) powertrain characteristic and an acceptable powertrain efficiency, the powertrain comprising an electric motor that complements power of the engine, and gearing defining parallel power flow paths from the motor and the engine to vehicle traction wheels, the method comprising:
determining an engine speed ($N_1$) that results in desired noise, vibration and harshness (NVH);
determining an engine speed ($N_2$) that results in engine best attainable powertrain efficiency for current operating conditions;

calculating a battery power bias ($P_{bias}$) that will protect the engine during operation under abnormal operating conditions;

determining available engine power at a target engine speed N, where N=$N_1$, when $N_1$ is less than $N_2$;

monitoring battery state of charge SOC;

determining engine power needed to maintain battery power $P_{SOC}$ at steady state SOC;

calculating a difference between a driver requested engine power and engine power available at the target engine speed N to determine battery power needed ($P_{bias-NVH}$) to effect desired NVH;

determining the maximum of values for $P_{bias-NVH}$, $P_{bias}$ and $P_{SOC}$;

calculating a difference between driver requested power and the battery power ($P_{SOC}$) to determine engine power $P_{engine}$, and calculating an engine speed based on $P_{engine}$; and operating the engine using a controller at an arbitrated engine speed that results in desired NVH and acceptable powertrain efficiency.

4. The method set forth in claim 3, wherein determining $P_{bias-NVH}$ includes limiting battery power to battery hardware limits.

5. The method set forth in claim 2, wherein the driver demanded wheel power is a function of vehicle traction wheel speed and a demanded traction wheel torque.

6. The method set forth in claim 3, wherein the driver demanded wheel power is a function of vehicle traction wheel speed and a demanded traction wheel torque.

7. The method set forth in claim 3 wherein calculating the batter power bias ($P_{bias-NVH}$) is done within power limits of the battery.

8. The method set forth in claim 2, wherein the optimum speed for engine efficiency corresponds to an engine power that is lower than a maximum available engine power.

9. The method set forth in claim 3, wherein the best engine efficiency corresponds to an engine power at a given engine speed that is lower than the maximum engine power at that engine speed.

10. The method set forth in claim 2, wherein the target engine speed for a given traction wheel speed is a function of a driver-controlled accelerator pedal position.

11. The method set forth in claim 3, wherein the engine speed ($N_1$) for a given traction wheel speed is a function of a driver-controlled accelerator pedal position.

12. A method, comprising:
controlling an engine of a hybrid electric vehicle powertrain having a battery powered electric motor and gearing defining parallel power flow paths from the electric motor and the engine to vehicle traction wheels using a controller to operate the engine at a lower engine speed relative to an engine speed associated with best available powertrain efficiency for a current vehicle speed to achieve a desired NVH characteristic.

13. The method of claim 12 further comprising:
increasing motor torque to deliver a desired power to the vehicle traction wheels based on a driver-controlled accelerator pedal position.

14. The method of claim 12 wherein operating the engine comprises adjusting a target engine speed based on demanded vehicle power associated with a driver-controlled accelerator pedal position and the current vehicle speed, the method further comprising:
adjusting battery power such that motor power associated with the adjusted battery power complements engine power associated with the lower engine speed and the current vehicle speed to provide the demanded vehicle power.

15. The method of claim 12 wherein the lower engine speed is retrieved from a look-up table based on the current vehicle speed, accelerator pedal position, and the desired NVH characteristic.

16. The method of claim 12 wherein operating the engine includes operating the engine to deliver less than maximum available engine power for the current vehicle speed.

17. A method for controlling a hybrid electric vehicle comprising:
controlling engine speed using a controller to a target engine speed corresponding to the lower of a first engine speed based on driver demanded power and current vehicle speed, and a second engine speed based on desired NVH, the target engine speed being less than an optimum speed for engine efficiency; and
controlling a battery powered electric motor using a controller to complement engine power to deliver the driver demanded power.

18. The method of claim 17 wherein operating the motor comprises adjusting battery power delivered to the motor based on the driver demanded power and the target engine speed.

19. A method comprising:
controlling an engine in a hybrid vehicle using a vehicle controller configured to: calculate a target engine speed for desired powertrain noise, vibration and harshness (NVH), where the target engine speed is less than an optimum speed for engine efficiency;
calculate an engine power at the target engine speed;
calculate an NVH bias battery power equal to the difference between the engine power at the target engine speed and a driver requested power;
calculate a steady state battery power;
calculate a final engine power equal to the difference between the driver requested power and the greater of the NVH bias battery power and the steady state battery power; and
command a final engine speed based on the final engine power to operate at an arbitrated engine speed that results in the desired NVH and the acceptable powertrain efficiency that is less than otherwise achievable powertrain efficiency for current operating conditions.

* * * * *